United States Patent
Chan

(10) Patent No.: US 12,055,303 B2
(45) Date of Patent: Aug. 6, 2024

(54) HIGH-EFFICIENT CENTRAL CHILLER PLANT SYSTEM WITH VARIABLE LOAD BY PHASE CHANGE MATERIAL THERMAL ENERGY STORAGE

(71) Applicant: BOCA INTERNATIONAL LIMITED, Kowloon (HK)

(72) Inventor: Kam Biu Richard Chan, Kowloon (HK)

(73) Assignee: BOCA INTERNATIONAL LIMITED, Kowloon (HK)

( * ) Notice: Subject to any disclaimer, the term of this patent is extended or adjusted under 35 U.S.C. 154(b) by 387 days.

(21) Appl. No.: 17/545,636

(22) Filed: Dec. 8, 2021

(65) Prior Publication Data

US 2022/0390125 A1    Dec. 8, 2022

(30) Foreign Application Priority Data

Aug. 6, 2021 (CN) .......................... 202110902392.0

(51) Int. Cl.
*F24D 11/02* (2006.01)
(52) U.S. Cl.
CPC .. *F24D 11/0292* (2013.01); *F24D 2220/0207* (2013.01); *F24D 2220/06* (2013.01); *F24D 2220/10* (2013.01)
(58) Field of Classification Search
CPC ............. F24D 11/0292; F24D 2220/06; F24D 2220/10; F24D 2220/0207; Y02E 60/14; Y02P 80/10
See application file for complete search history.

(56) References Cited

U.S. PATENT DOCUMENTS

| 4,173,125 | A | * | 11/1979 | Bradshaw | .............. F25B 29/003 165/62 |
| 4,199,101 | A | * | 4/1980 | Bramow | .............. G05D 23/185 236/13 |
| 4,226,089 | A | * | 10/1980 | Barrow | ................. F25B 29/003 62/84 |
| 7,516,600 | B1 | * | 4/2009 | Flora | ......................... F25D 3/08 53/472 |
| 10,578,369 | B1 | * | 3/2020 | Johnson | ................ F28D 20/003 |

(Continued)

*Primary Examiner* — Frantz F Jules
*Assistant Examiner* — Martha Tadesse
(74) *Attorney, Agent, or Firm* — MUNCY GEISSLER OLDS & LOWE P.C.

(57) ABSTRACT

A high-efficient central chiller plant system with variable load by phase change material thermal energy storage includes a refrigeration unit and a phase change thermal energy storage. The refrigeration unit operates under the highest COP. If the refrigerating output is higher than the demand of cooling load, the phase change thermal energy storage stores energy by the phase change. Contrarily, if the refrigerating output cannot meet the demand of cooling load, the phase change thermal energy storage releases energy to supply the insufficient cooling load of the refrigeration unit. So that users can set the operation strategy of the refrigeration unit according to the usage statistics, and let the refrigeration unit operate efficiently with the cooperation of the phase change thermal energy storage, thereby effectively improving the energy efficiency of the system operation to save energy. Compared with the existing central chiller system, it saves energy more than 40%-70%.

7 Claims, 2 Drawing Sheets

(56) References Cited

U.S. PATENT DOCUMENTS

| | | | |
|---|---|---|---|
| 10,852,008 B2* | 12/2020 | Daniels | F24D 17/0078 |
| 2003/0033831 A1* | 2/2003 | Davies | F28D 21/001 |
| | | | 62/332 |
| 2004/0016245 A1* | 1/2004 | Pierson | F24F 3/06 |
| | | | 62/175 |
| 2024/0125484 A1* | 4/2024 | Kirschner | F24D 3/08 |

* cited by examiner

HIGH-EFFICIENT CENTRAL CHILLER PLANT SYSTEM WITH VARIABLE LOAD BY PHASE CHANGE MATERIAL THERMAL ENERGY STORAGE

FIELD OF THE INVENTION

The present invention involves a central chiller plant system, more specially a super high-efficient central chiller plant system with variable load by phase change material thermal energy storag technology.

BACKGROUND OF THE INVENTION

To evaluate the power consumption (acting) index of a refrigeration unit is the COP (Coefficient of Performance) of the refrigeration cycle. The COP refers to the ratio of the refrigeration (acting) to the power consumption (acting) when the refrigeration unit completes a refrigeration cycle, that is, the refrigeration efficiency of the unit. Different types of refrigeration units have different refrigeration efficiency. The refrigeration units can generally be divided into three categories according to the types of their main compressor components: the piston, the screw, and the centrifugal one.

The piston refrigeration unit is used in occasions where the demand for cooling capacity is low. The screw refrigeration unit is used in medium-sized enterprises. And the centrifugal refrigeration units are used in medium and large enterprises. Due to the difference in the principle and structure of the compressor, the COP between the three is far different. According to the present technology, the COP of a piston refrigeration unit is about 3-4 under standard operating conditions. The COP of screw refrigeration unit can reach around 4-5, while the COP of centrifugal refrigeration units can reach up to 5-6. Therefore, the efficiency of the centrifugal refrigeration unit is the highest. The average COP of the centrifuges chiller plant system with water pump and water tower in general commercial buildings is only 4 at most.

Refers to FIG. 2, the COP increases with the decrease of the condensing temperature and the increase of the word load. In general situation, in order to maximize the COP of the unit, users always hope that the refrigeration unit can operate under full load as much as possible. However, in actual use, considering the weather, the refrigeration unit does not operate at full capacity during most of the year. Most of them operate between partial loads, so the refrigeration efficiency is relatively low compared to the top efficiency. The operating characteristics of the centrifugal refrigeration unit are different from the piston and the screw ones. Its COP characteristic curve will be greatly enhanced by using a variable speed motor. As shown in the left half of above figure, the COP of the unit has been greatly improved compared to the ordinary centrifugal unit while works under partial loads. And this is a great breakthrough. But look into above picture, you can find that there is still limitation of the COP that is improved by the variable speed motor. The work load must be between 40%-60% to reach the highest COP. However, the central chiller plant system, in most of year, do not operate in this interval. Therefore, it is difficult to achieve the best results by simply using a variable speed motor.

SUMMARY OF THE INVENTION

In view of aforesaid drawbacks of the prior art, the present invention provides a high-efficient central chiller plant system with variable load by phase change material thermal energy storage, by using the phase change material thermal energy storage to achieve the refrigeration unit operating in a partial load with high efficiency under unbalanced strategy and ensure the whold work load requirements.

So, the present invention provides:

High-efficient central chiller plant system with variable load by phase change material thermal energy storage, wherein comprising a refrigeration unit and a phase change thermal energy storage, the chilled water outlet of the refrigeration unit is connected to the first chilled water pipeline through a primary chilled water pump, and the end of the first chilled water pipeline is equipped with a delivery pump, the outlet of the delivery pump is connected to the user's air supply system by the second chilled water pipeline; the outlet of air supply system is connected to the returned water pipeline, and the returned water pipeline is connected to the water inlet of the refrigeration unit; one port of the phase change thermal energy storage is connected to the first chilled water pipeline between the primary chilled water pump and delivery pump, and the other port of the phase change thermal energy storage is connected to returned water pipeline; the system controls the chilling capacity of the refrigeration unit, the flow of the primary chilled water pump and delivery pump to realize the phase change thermal energy storage for storage or release of energy as follow:

When the phase change thermal energy storage stores energy, the flow volume of the delivery pump is reduced and/or the flow volume of the refrigeration unit is increased to let the water pressure in the first chilled water pipeline higher than the returned water pipeline, and the chilled water in the first chilled water pipeline flows into the phase change thermal energy storage to make phase change of the phase change material for energy storage; then the temperature of the chilled water rises, and the chilled water flows out of the phase change thermal energy storage and finally flows into the returned water pipeline;

When the phase change thermal energy storage releases energy, the flow volume of the delivery pump is increased and/or the flow volume of the refrigeration unit is reduced or even shutdown to let the water pressure in the returned water pipeline higher than the first chilled water pipeline, and the returned water in the returned water pipeline flows into the phase change thermal energy storage to make phase change of the phase change material for energy release; then the temperature of the returned water cool down, and the returned water flows out of the phase change thermal energy storage and flows into the first chilled water pipeline, then is pressurized by the delivery pump and delivered by the second chilled water pipeline the user's air supply system.

Further, two refrigeration unit are configured in series to form a refrigeration unit chains, and one or more refrigeration unit chains are configured in parallel to form a refrigeration unit group.

Further, the number of primary chilled water pump is more than one, the primary chilled water pumps are configured in parallel, their inlets are connected in parallel to the chilled water outlet of the refrigeration unit, and their outlets are connected in parallel to the first chilled water pipeline.

Further, the two refrigeration units in the refrigeration unit chain are configured in series and divided into a high-temperature refrigeration unit and a low-temperature refrigeration unit; in specific, in the evaporator circuit, the returned water pipeline is connected to the water inlet of the evaporator circuit of the high-temperature refrigeration unit, and the water outlet of the evaporator circuit of the high-temperature refrigeration unit is connected to the water inlet of the evaporator circuit of the low-temperature refrigeration unit, then the water outlet of the evaporator circuit of the low-temperature refrigeration unit is connected to the primary chilled water pump; in the condenser circuit, the cooling tower is connected to the cooling pump through the condensate pipe, the outlet of the cooling pump is connected to the inlet of the condenser circuit of the low-temperature refrigeration unit through the condensate pipe, the outlet of the condenser circuit of the low-temperature refrigeration unit is connected to the inlet of the condenser circuit of the high-temperature refrigeration unit, and the outlet of the condenser circuit of the high-temperature refrigeration unit is connected to the cooling tower.

Further, the number of the cooling pump is more than one, the cooling pumps are configured in parallel, the inlets are connected in parallel to the outlet of the cooling tower, and the outlet are connected in parallel to the inlet of the condenser circuit of the low-temperature refrigeration unit.

Further, the control strategies of the system for storing and releasing energy of the phase change thermal energy storage include:

strategy of energy storage, when the demand of cooling load is low, the refrigeration unit keeps operating under the specified COP of the load-COP curve, and the phase change thermal energy storage is set to work under energy storage, so that the refrigerating output of the refrigeration unit is stored in the phase change thermal energy storage;

strategy of energy release, when the demand of cooling load is high and greater than the work load of which the refrigeration unit operates under the specified COP of the load-COP curve, the refrigeration unit still keeps operating under the specified COP of the load-COP curve, and the phase change thermal energy storage is set to work under energy release, so that the system can meet the demand of cooling load; or when the refrigeration unit is shut down, the phase change thermal energy storage is set to work under energy release to provide and meet the demand of cooling load.

Further, the control strategies also include:

strategy of low-cost energy storage, according to cost of the power supply, while the cost is low, the refrigeration unit keeps operating under the specified COP of the load-COP curve, and the phase change thermal energy storage is set to work under energy storage, so that the refrigerating output of the refrigeration unit is stored in the phase change thermal energy storage.

The present invention has the following advantages: in generally, the normal operating mode of the refrigeration unit is to adjust the output refrigeration capacity according to the work load change. Therefore, when the load is low, the COP of the refrigeration unit will rapidly decrease. In order to realize that the chiller system maintains the efficient operation of under different work load, that is, under variable work load, the phase change thermal energy storage is added into the system to realize phase-change energy storage and release. The refrigeration unit operates under the highest COP. If the refrigerating output is higher than the demand of cooling load, the phase change thermal energy storage stores energy by the phase change. Contrarily, if the refrigerating output cannot meet the demand of cooling load, the phase change thermal energy storage releases energy to supply the insufficient cooling load of the refrigeration unit. So that users can set the operation strategy of the refrigeration unit according to the usage statistics, and let the refrigeration unit operate efficiently with the cooperation of the phase change thermal energy storage, thereby effectively improving the energy efficiency of the system operation to save energy. Compared with the existing central chiller system, it saves energy more than 40%-70%. In addition, users can keep the refrigeration unit operating efficiently at the period of low cost of electricity, such as the night time and store the refrigeration output in the phase change thermal energy storage, then release the stored energy in day time, thereby reducing the electricity cost of the operation. Moreover, the design of the phase change thermal energy storage of the present invention is simple and efficient. The phase change thermal energy storage operate in different stage of energy storage or release only by the cooperation of the flow or pressure of the primary chilled water pump and the delivery pump. So that it simplifies the design and reduces the control valves to make the system operation more stable and reliable, reduce the occurrence of failures, and thus reduce the maintenance cost of the system operation.

BRIEF DESCRIPTION OF THE DRAWINGS

Below are explanations of the invention combining with drawings.

DESCRIPTION OF THE EMBODIMENTS

Figure 1:
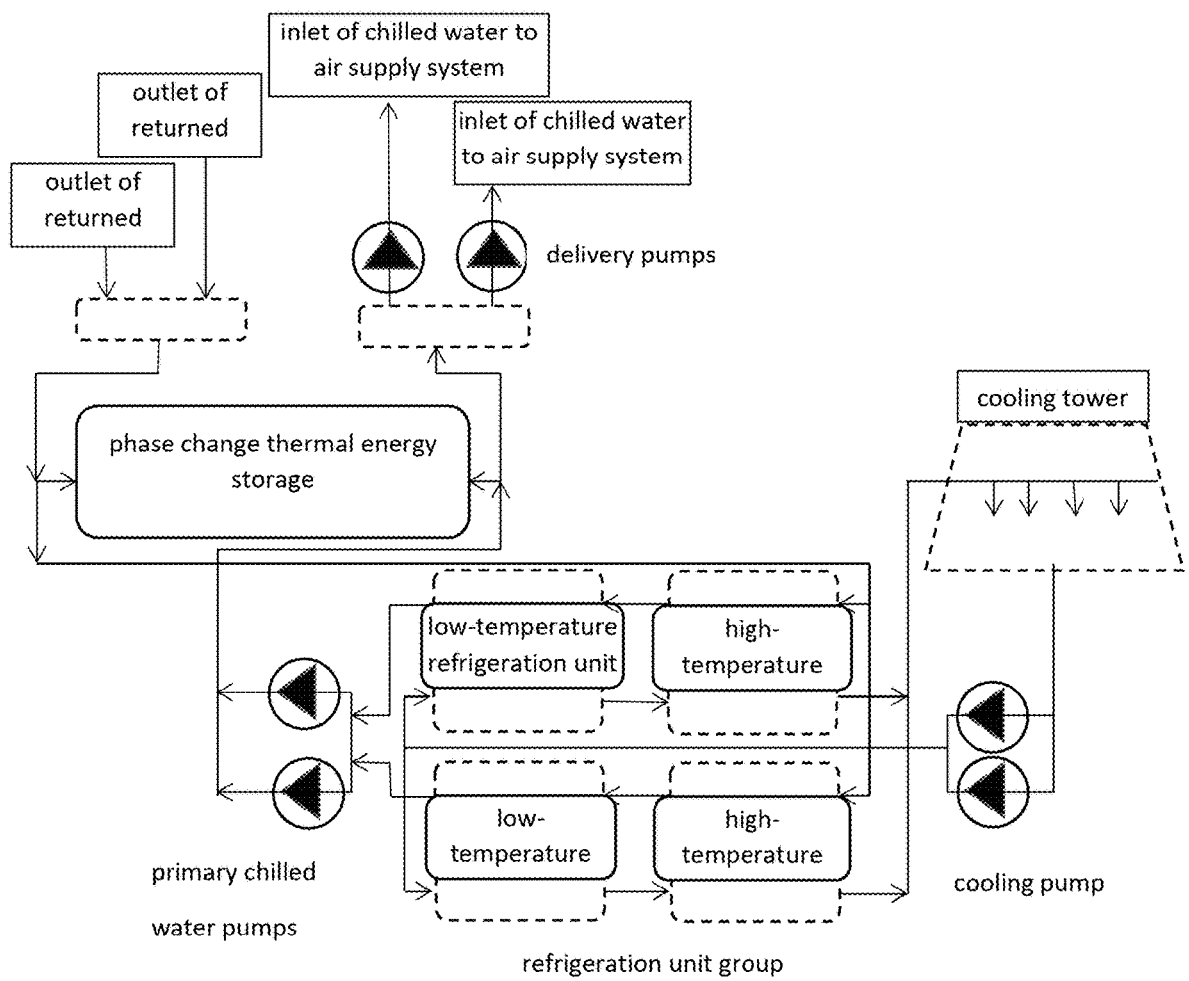
FIG. 1 is the schematic diagram of the structure of the present invention.

As shown in FIG. 1, the high-efficient central chiller plant system with variable load by phase change material thermal energy storage includes a refrigeration unit and a phase change thermal energy storage. The refrigeration unit can use the existing central chiller refrigerator, such as piston, screw or centrifugal ones. The interior of the phase change thermal energy storage is composed of a large number of phase-change storage plates. The heat storage plates are filled with eutectic salt materials. The heat storage plates are also provided with chilled water circulation channels, which let the water flow and exchange heat with the heat storage plates, so that the eutectic salt material realizes the phase change to complete the energy storage or release function.

The chilled water outlet of the refrigeration unit is connected to the first chilled water pipeline through a primary chilled water pump, and the end of the first chilled water pipeline is equipped with a delivery pump. The outlet of the delivery pump is connected to the user's air supply system by the second chilled water pipeline. The outlet of air supply system is connected to the returned water pipeline, and the returned water pipeline is connected to the water inlet of the refrigeration unit. One port of the phase change thermal energy storage is connected to the first chilled water pipeline between the primary chilled water pump and delivery pump, and the other port of the phase change thermal energy storage is connected to returned water pipeline. In generally, the normal operating mode of the refrigeration unit is to adjust the output refrigeration capacity according to the work load change. Therefore, when the load is low, the COP of the refrigeration unit will rapidly decrease. In order to realize that the chiller system maintains the efficient operation of under different work load, that is, under variable work load, the phase change thermal energy storage is added into the system to realize phase-change energy storage and release. The refrigeration unit operates under the highest COP. If the refrigerating output is higher than the demand of cooling load, the phase change thermal energy storage stores energy by the phase change. Contrarily, if the refrigerating output cannot meet the demand of cooling load, the phase change thermal energy storage releases energy to supply the insufficient cooling load of the refrigeration unit. So that users can set the operation strategy of the refrigeration unit according to the usage statistics, and let the refrigeration unit operate efficiently with the cooperation of the phase change thermal energy storage, thereby effectively improving the energy efficiency of the system operation to save energy. Compared with the existing central chiller system, it saves energy more than 40%-70%.

The system controls the chilling capacity of the refrigeration unit, the flow of the primary chilled water pump and delivery pump to realize the phase change thermal energy storage for storage or release of energy as follow:

When the phase change thermal energy storage stores energy, one is to reduce the demand of cooling load by users. For example, the number of users in air supply system is reduced, or air supply system reduces the load due to the decrease in ambient temperature. At this time, the delivery of the delivery pump will also be reduced accordingly. The other is to increase the operating refrigeration units in the refrigeration unit group, and at the same time turn on more primary chilled water pumps to increase the refrigeration output of the refrigeration unit group. The above two options will increase the water pressure in the first chilled water pipeline to be greater than the returned water pipeline, and the chilled water in the first chilled water pipeline flows into the phase change thermal energy storage to make the phase-change material phase-change and store energy. After the phase-change energy storage is completed, the temperature of the chilled water rises and flows out of the phase change thermal energy storage through the port into the returned water pipeline, where it mixes with the returned water of air supply system and flows back to the water inlet of the evaporator of the refrigeration unit When the phase change thermal energy storage releases energy, one is that the number of users in air supply system suddenly increases and the refrigeration output of the refrigeration unit cannot meet the demand. The other is that the phase change thermal energy storage has enough energy stored to meet the supply, and the refrigeration unit group has been completely shut down. So, the water pressure in the returned water pipeline is greater than the first chilled water pipeline, and the water in the returned water pipeline flows into the phase change material thermal energy storage and make phase-change material phase change to release the energy storage, so as to make the returned water chill and then flow out of the phase change material thermal energy storage at the other port to enter the first chilled water pipeline. Then the chilled water is pressurized by the delivery pump and enter the second chilled water pipeline to deliver to the user's air supply system.

From above work process of energy storage and release, it shows that the design of the phase change thermal energy storage of the present invention is simple and efficient. The phase change thermal energy storage operate in different stage of energy storage or release only by the cooperation of the flow or pressure of the primary chilled water pump and the delivery pump. So that it simplifies the design and reduces the control valves to make the system operation more stable and reliable, reduce the occurrence of failures, and thus reduce the maintenance cost of the system operation.

Figure 2:
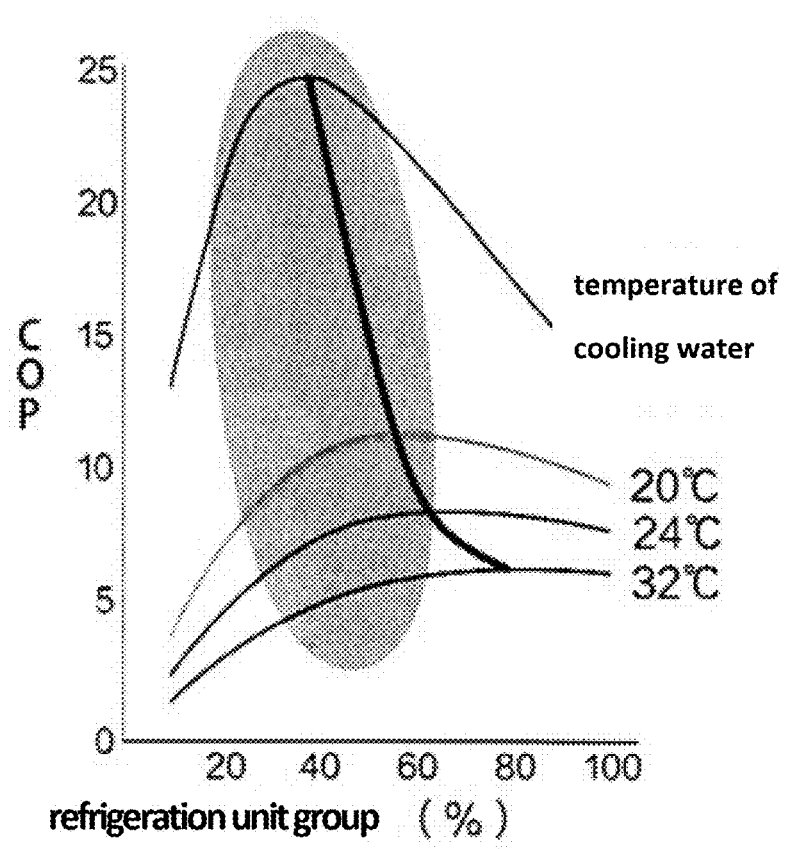
FIG. 2 is a load-COP curve diagram of the refrigeration unit under different chilled water temperatures.

The refrigeration unit group of the existing central chiller system usually adopts a parallel connection of multiple refrigeration units, and the chilled water outlet of the evaporator circuit of each refrigeration unit is equipped with a primary chilled water pump to control the chilled water flow of each refrigeration unit. Similarly, the condenser circuit of each refrigeration unit is also provided with a cooling pump separately. Since the primary chilled water pump and the cooling pump consume power during operation, especially when the load is small, the proportion of above power consumption in the whole power consumption will be greatly increased. Referring to FIG. 2, according to the load-COP curve, the efficiency of the refrigeration unit is related to the temperature of the chilled water. The lower temperature of the chilled water, the higher COP. In order to further improve the energy efficiency of the refrigeration unit, the present invention prefer to use two refrigeration units connected in series to form a refrigeration unit chains, and one or more refrigeration unit chains are connected in parallel to form the refrigeration unit group. More specifically:

The two refrigeration units in the refrigeration unit chain are configured in series and divided into a high-temperature refrigeration unit and a low-temperature refrigeration unit In the evaporator circuit, the returned water pipeline is connected to the water inlet of the evaporator circuit of the high-temperature refrigeration unit, and the water outlet of the evaporator circuit of the high-temperature refrigeration unit is connected to the water inlet of the evaporator circuit of the low-temperature refrigeration unit, then the water outlet of the evaporator circuit of the low-temperature refrigeration unit is connected to the primary chilled water pump. As the same, the number of primary chilled water pump is more than one, the primary chilled water pumps are configured in parallel, their inlets are connected in parallel to the chilled water outlet of the refrigeration unit, and their outlets are connected in parallel to the first chilled water pipeline. That is, the number of the operating primary chilled water pump is only determined according to the demand for cooling load, and has nothing to do with the refrigeration units.

In the condenser circuit, the cooling tower is connected to the cooling pump through the condensate pipe, the outlet of the cooling pump is connected to the inlet of the condenser circuit of the low-temperature refrigeration unit through the condensate pipe, the outlet of the condenser circuit of the low-temperature refrigeration unit is connected to the inlet of the condenser circuit of the high-temperature refrigeration unit, and the outlet of the condenser circuit of the high-temperature refrigeration unit is connected to the cooling tower. As the same, the number of the cooling pump is more than one, the cooling pumps are configured in parallel, the inlets are connected in parallel to the outlet of the cooling tower, and the outlet are connected in parallel to the inlet of the condenser circuit of the low-temperature refrigeration unit.

In order to cooperate with the settings of the system and realize the central chiller system work more efficient under the variable load, the inventor also provides the control strategies of the system as follow:

Strategy of energy storage: when the demand of cooling load is low, the refrigeration unit keeps operating under the specified COP of the load-COP curve, and the phase change thermal energy storage is set to work under energy storage, so that the refrigerating output of the refrigeration unit is stored in the phase change thermal energy storage.

Strategy of energy release: when the demand of cooling load is high and greater than the work load of which the refrigeration unit operates under the specified COP of the load-COP curve, the refrigeration uint still keeps operating under the specified COP of the load-COP curve, and the phase change thermal energy storage is set to work under energy release, so that the system can meet the demand of cooling load; or when the refrigeration unit is shut down, the phase change thermal energy storage is set to work under energy release to provide and meet the demand of cooling load.

Strategy of low-cost energy storage: according to cost of the power supply, while the cost is low, the refrigeration unit keeps operating under the specified COP of the load-COP curve, and the phase change thermal energy storage is set to work under energy storage, so that the refrigerating output of the refrigeration unit is stored in the phase change thermal energy storage.

According to the test result by inventor, the central chiller system provided by the present invention can increase the energy efficiency by more than 40%-70% compared with the existing chiller system. For details, refer to the comparison data in Table 1 below.

TABLE 1

Comparison of energy efficiency and energy saving of different central chiller systems

| Chiller Type | Efficiency | Increase of efficiency | Power consumption (10,000 kWh) | Absolute amount of energy saving (10,000 kWh) | Energy saving ratio (%) |
| --- | --- | --- | --- | --- | --- |
| Old central chiller | 2.0 | 0.0 | 300.0 | 0.0 | 0.0 |
| New central chiller | 2.2 | 0.2 | 272.7 | 27.3 | 9.1 |
| Central chiller with energy efficiency 3.0 (usually used in hotels) | 3.0 | 1.0 | 200 | 100 | 33.3 |
| Central chiller of the present invention | 7.0 | 5.0 | 85.7 | 214.3 | 71.4 |

The invention claimed is:

1. A high-efficient central chiller plant system with variable load by phase change material thermal energy storage, comprising a refrigeration unit and a phase change thermal energy storage, a chilled water outlet of the refrigeration unit is connected to a first chilled water pipeline through a primary chilled water pump, and an end of the first chilled water pipeline is equipped with a delivery pump, an outlet of the delivery pump is connected to a user's air supply system by a second chilled water pipeline; an outlet of the user's air supply system is connected to a returned water pipeline, and the returned water pipeline is connected to a water inlet of the refrigeration unit; one part of the phase change thermal energy storage is connected to the first chilled water pipeline between the primary chilled water pump and the delivery pump, and another part of the phase change thermal energy storage is connected to the returned water pipeline; the system controls a chilling capacity of the refrigeration unit, a flow of the primary chilled water pump and the delivery pump to realize the phase change thermal energy storage for storage or a release of energy as follow: when the phase change thermal energy storage stores energy, a flow volume of the delivery pump is reduced and/or a flow volume of the refrigeration unit is increased to let a water pressure in the first chilled water pipeline higher than the returned water pipeline, and a chilled water in the first chilled water pipeline flows into the phase change thermal energy storage to make phase change of the phase change material for energy storage; then a temperature of the chilled water rises, and the chilled water flows out of the phase change thermal energy storage and finally flows into the returned water pipeline; when the phase change thermal energy storage releases energy, the flow volume of the delivery pump is increased and/or the flow volume of the refrigeration unit is reduced or even shutdown to let a water pressure in the returned water pipeline higher than the first chilled water pipeline, and a returned water in the returned water pipeline flows into the phase change thermal energy storage to make phase change of the phase change material for energy release; then a temperature of the returned water cool down, and the returned water flows out of the phase change thermal energy storage and flows into the first chilled water pipeline, then is pressurized by the delivery pump and delivered by the second chilled water pipeline the user's air supply system.

2. The high-efficient central chiller plant system with variable load by phase change material thermal energy storage of claim 1, wherein two refrigeration units are configured in series to form a refrigeration unit chains, and the refrigeration unit chains are configured in parallel to form a refrigeration unit group.

3. The high-efficient central chiller plant system with variable load by phase change material thermal energy storage of claim 1, wherein a number of the primary chilled water pump is more than one, the primary chilled water pumps are configured in parallel, the primary chilled water pumps inlets are connected in parallel to the chilled water outlet of the refrigeration unit, and the primary chilled water pumps outlets are connected in parallel to the first chilled water pipeline.

4. The high-efficient central chiller plant system with variable load by phase change material thermal energy storage of claim 2, wherein two of the refrigeration units in the refrigeration unit chains are configured in series and divided into a high-temperature refrigeration unit and a low-temperature refrigeration unit; in an evaporator circuit, the returned water pipeline is connected to a water inlet of the evaporator circuit of the high-temperature refrigeration unit, and a water outlet of the evaporator circuit of the high-temperature refrigeration unit is connected to a water inlet of the evaporator circuit of the low-temperature refrigeration unit, then a water outlet of the evaporator circuit of the low-temperature refrigeration unit is connected to the primary chilled water pump; in a condenser circuit, a cooling tower is connected to a cooling pump through a condensate pipe, an outlet of the cooling pump is connected to an inlet of the condenser circuit of the low-temperature refrigeration unit through the condensate pipe, an outlet of the condenser circuit of the low-temperature refrigeration unit is connected to an inlet of the condenser circuit of the high-temperature refrigeration unit, and an outlet of the condenser circuit of the high-temperature refrigeration unit is connected to the cooling tower.

5. The high-efficient central chiller plant system with variable load by phase change material thermal energy storage of claim 4, wherein a number of the cooling pump is more than one, the cooling pumps are configured in parallel, the cooling pumps inlets are connected in parallel to an outlet of the cooling tower, and the outlet of the cooling tower is connected in parallel to the inlet of the condenser circuit of the low-temperature refrigeration unit.

6. The high-efficient central chiller plant system with variable load by phase change material thermal energy storage of claim 1, wherein a control strategies of the system for storing and releasing energy of the phase change thermal energy storage include: strategy of energy storage, when the demand of cooling load is low, the refrigeration unit keeps operating under a specified COP of a load-COP curve, and the phase change thermal energy storage is set to work under energy storage, so that a refrigerating output of the refrigeration unit is stored in the phase change thermal energy storage; strategy of energy release, when a demand of cooling load is high and greater than a work load of which the refrigeration unit operates under the specified COP of the load-COP curve, the refrigeration unit still keeps operating under the specified COP of the load-COP curve, and the phase change thermal energy storage is set to work under energy release, so that the system meets the demand of cooling load; or when the refrigeration unit is shut down, the phase change thermal energy storage is set to work under the energy release to provide and meet the demand of cooling load.

7. The high-efficient central chiller plant system with variable load by phase change material thermal energy storage of claim 6, wherein the control strategies also include: strategy of low-cost energy storage, according to a cost of a power supply, while the cost is low, the refrigeration unit keeps operating under the specified COP of the load-COP curve, and the phase change thermal energy storage is set to work under energy storage, so that the refrigerating output of the refrigeration unit is stored in the phase change thermal energy storage.

* * * * *